United States Patent [19]
Garabello

[11] 3,900,988
[45] Aug. 26, 1975

[54] RETRACTABLE LANDING GEAR

[76] Inventor: Romano Garabello, 2030 73rd St., Brooklyn, N.Y. 11204

[22] Filed: July 1, 1974

[21] Appl. No.: 484,432

[52] U.S. Cl. .................... 46/76; 46/78; 244/102 R
[51] Int. Cl. .............................................. A63h 27/02
[58] Field of Search ........... 46/76 R, 78; 244/102 R, 244/102 SL

[56] References Cited
UNITED STATES PATENTS

| | | | |
|---|---|---|---|
| 2,391,998 | 1/1946 | Palmer et al. .................... | 244/102 R |
| 2,896,369 | 7/1969 | Palensky .......................... | 46/76 R |
| 3,431,672 | 3/1969 | Andrae et al. .................... | 46/78 |
| 3,739,519 | 6/1973 | Garabello ......................... | 46/78 |

*Primary Examiner*—Louis G. Mancene
*Attorney, Agent, or Firm*—Bauer & Amer

[57] ABSTRACT

A retractable landing gear assembly capable of being mounted as a unit in a wing of a model aircraft, including a relatively movable cam and cam follower to operate the landing gear between its fully retracted and full down and locked position, and wherein the same includes means to move and retain the landing gear in its full down and locked position.

20 Claims, 5 Drawing Figures

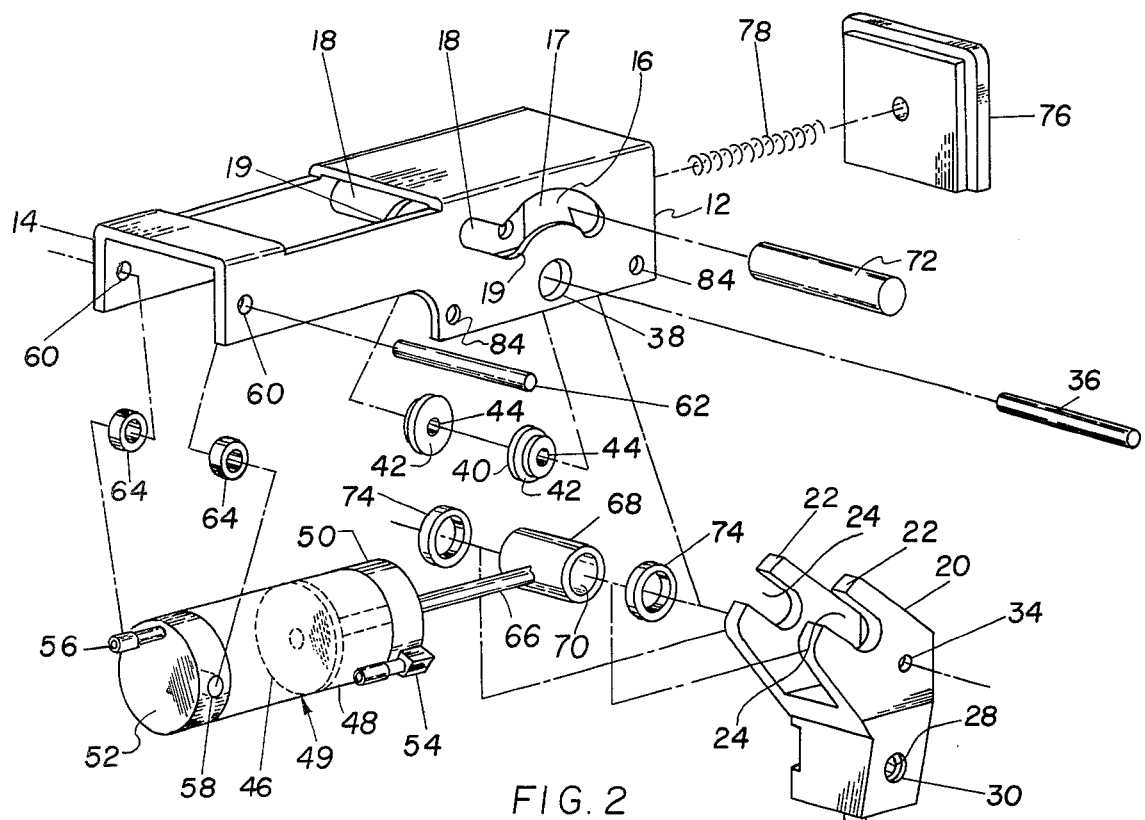
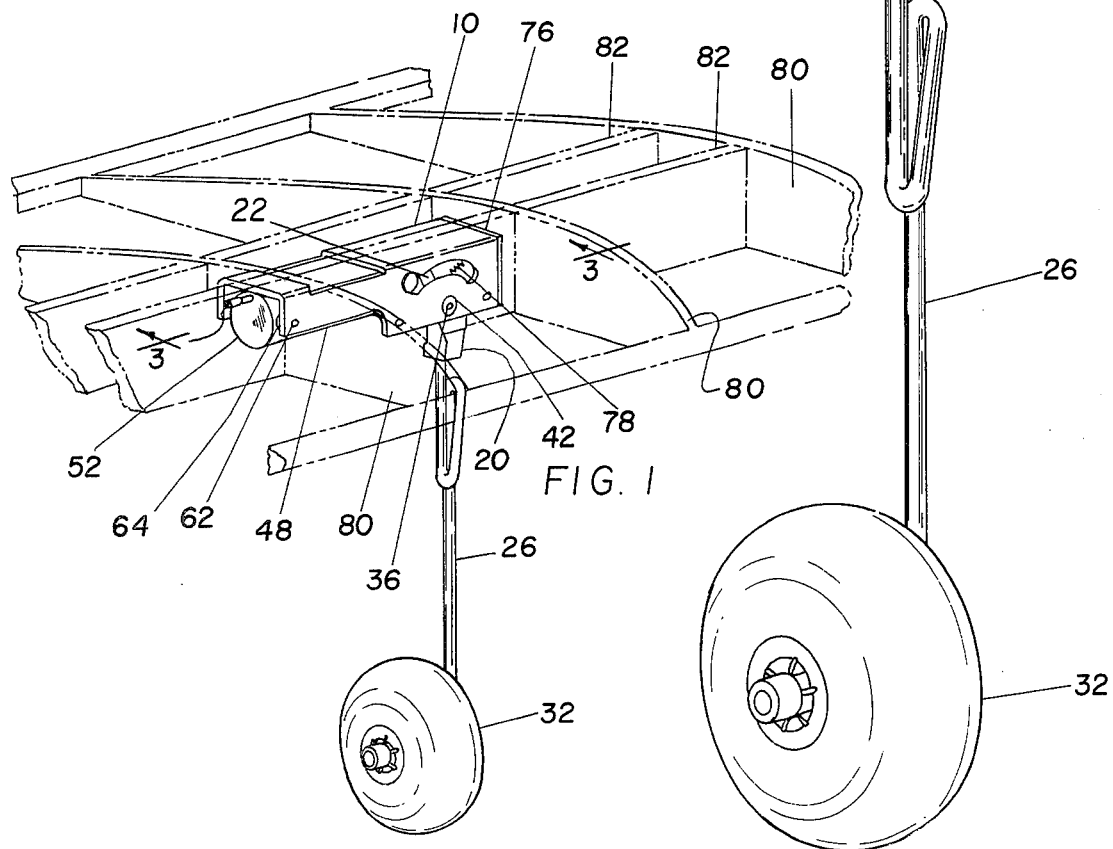

RETRACTABLE LANDING GEAR

BACKGROUND OF THE INVENTION

This invention relates to a landing gear and more particularly to a landing gear system employing simplified means to lock the landing carriage or strut in the wheels down position.

In construction of model aircraft, it is often desirable to provide means to retract the landing gear. Besides the more realistic appearance provided by a model in flight with the landing assemblies retracted, in certain aspects of model aircraft competition, retractable landing gear are a necessity.

As with all aircraft, weight and strength considerations are of primary importance. Not only does the addition of means for retracting the landing gear add weight, but oftentimes accommodating the retracting device necessitates cutting into the aircraft's superstructure. This cutting results in undesirable stress rising or stress concentrating notches and cuts. Moreover, associated with addition of retractable assemblies to flying models is the ever present hazard of failure of some component causing the landing assembly to freeze in a position other than fully extended.

Heretofore apparatuses have been complicated and heavy, require extensive superstructure modification and have been devoid of simplified means, if any, for locking the landing gear, or part thereof, in the wheels full down and locked position.

For example, U.S. Pat. No. 3,431,672 teaches the use of small electric motors driving intermediate gears to power the retractable landing assemblies. Yet electric systems have inherent disadvantages not the least of which is their generation of "noise" and spurious emissions. These emissions can adversly affect the sensitive and proximately placed receivers in the aircraft resulting in partial, if not total, loss of model control.

Then, too, U.S. Pat. No. 3,739,519 discloses a pressure operated retractable landing gear assembly in which a double-acting piston causes the landing gear to pivot between a retracted and extended position. Yet no independent means for locking the landing gear in the extended position is shown or disclosed, other than inherent pneumatic or hydraulic lock, as the case may be, provided by fluid pressure operating on the piston.

And, in prior apparatus no simplified fail-safe apparatus has been devised and this has been a drawback of retractable systems.

SUMMARY OF THE INVENTION

It is, therefore, an object of the present invention to provide a light-weight retractable landing gear.

It is another object of the present invention to provide a light-weight retractable landing gear that is self-lockable in the extended or wheels down positioon and wherein the locking system does not depend on fluid pressure.

It is a further object of the present invention to provide a fluid pressure operated landing assembly that employs a fail-safe system which will activate automatically on loss of fluid pressure and cause deployment of the landing wheels into the full down and locked position.

It is a still further object of the present invention to provide a simplified self-locking landing gear that can be easily removed from the aircraft and which itself can be readily dismantled.

It is yet another object of the present invention to provide a self-locking landing gear adopted to fit within the aircraft without having to cut or weaken the latter's superstructure.

Other objects and features of the present invention will become apparent from the following detailed description considered in connection with the accompanying drawings. It is to be understood, however, that the drawings are designed for the purposes of illustration only and not as a definition of the limits of the invention for which reference should be made to the appending claims.

In the drawings wherein similar reference characters denote similar elements throughout the several views:

DESCRIPTION OF THE DRAWINGS

FIG. 1 is a perspective view of the retractable landing gear apparatus showing its placement in an aircraft wing according to the invention and with a part in the fully extended or wheels down position;

FIG. 2 is an exploded perspective view on enlarged scale;

Figure 3:
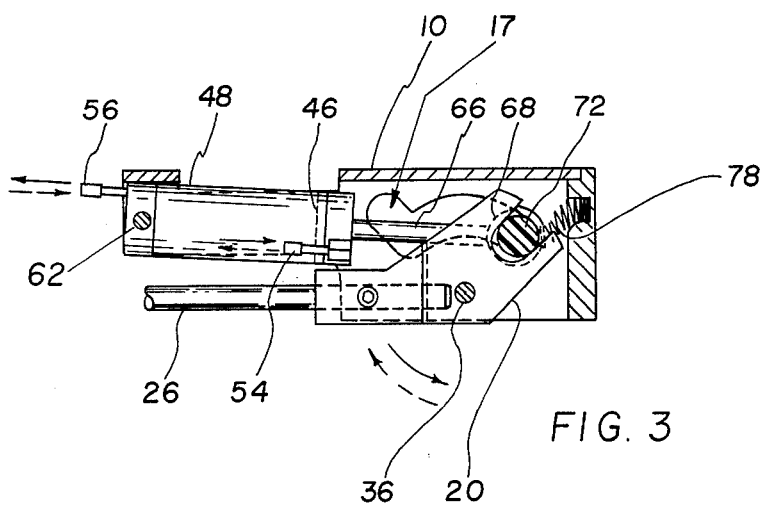
FIG. 3 is a partly sectional view taken on line 3—3 of FIG. 1 on a slightly enlarged scale and showing the landing gear in the fully retracted position.

More particularly and referring now to FIGS. 1 and 2, there is shown the preferred embodiment of the present invention. A frame 10 is bent into a U-shape by forming a pair of parallel opposed sides 12 and 14. Each of sides 12 and 14 includes a cam path or control surface seen generally by reference numeral 17. Each control path or curve 17 includes a first portion 16 preferably of curvilinear shape, and merging with it, a second portion or locking detent 18. The second or locking detent portion 18 is disposed at an acute angle directed upward and away from the lowermost point of merger 19 with the first portion 16 as shown. A part here referred to as a support bracket 20 includes a pair of parallel opposed arms 22. Each of arms 22 is provided with a cam slot or raceway 24. A landing part or strut 26 is, on one end, detachably secured to bracket 20 by various fastening means. For example in the embodiment shown, a screw 28 threadably engages the support part 20 by means of tapped aperture 30 whereby the screw frictionally engages and secures strut 26 to part 20. Rivets or drift pins may also be used. The other end of strut 26 carries a wheel 32 or skid, the latter of which is not shown. Disposed through each arm 22 is an aperture 34. A pivot pin 36 is adopted to slide through apertures 34 so that the bracket is freely pivotal thereon as described below.

Each frame side 12 and 14 further carries a bearing aperture 38. A pair of bearing collars 40 with associated flanges 42 simply fit into apertures 38 so that each flange seats in a respective aperture 38 and is flush with the outboard face of side 12 and 14. It will be observed that each collar 40 includes a bore 44 concentric with its outside diameter and is, therefore, able to journal pivot pin 36 therein. Collars 40 may comprise self-lubricating nylon, hard plastic, soft metals and the like. Bracket 20 is positioned between collars 40. Pivot pin 36 is driven into apertures 44 and bores 34 to thereby rotatably secure or hinge the bracket in the included channel of frame 10. The sizing of the outside diameter of pivot pin 36 and apertures 44 is such that when the former is driven into the latter, and thereby hinge bracket 20, the pin is frictionally held therebetween. Bracket 20 is then readily dismantled from frame 10 by pushing pin 36 along its longitudinal axis through and free of collars 40.

A cam follower or guide pin 72 is cut so as to span between the two opposed control paths 17. Follower 72 fits in slots or raceways 24 and is slidably guided therein. Thus, relative movement of follower 72 between it and control path 17 will, as described hereinafter, cause bracket 20 to rotate between an extended or wheels down position, and a retracted or wheels up configuration.

A prime mover or activator means, seen generally by reference numeral 49, is so supported and connected so as to effect relative movement between follower 72 and control slot or path 17. The activation means may comprise a solenoid, a pressure activated device, combination of the former and latter, or other means capable of driving the follower relative to control path 17. In the present structure, the prime mover or activator includes a double-acting fluid pressure operating device. As such, and by way of example only, the activator will comprise a piston 46 slidably disposed in cylinder 48. Cylinder 48 contains end caps 50 and 52 each of which includes a respective inlet-outlet means 54 and 56. Inlet-outlet means 54 and 56 provide access to the working space in cylinder 48 depending on direction of fluid flow, described below. In the preferred mode cylinder 48 is demountably attached to frame 10 and to accomplish same end cap 52 includes a lateral bore 58. Disposed through opposed rearward portions of sides 12 and 14 are drift apertures 60. A drift pin 62 is driven through apertures 60 and into engagement with bore 58. As seen in FIGS. 1 and 2, spacers 64 are positioned lateral of bore 58 and are captured by pin 62 so as to centrally position activator means 49 in the included or U-shaped portion of frame 10 defined by sides 12 and 14. As with the securement of pivot pin 36, drift pin 62 is likewise demountably held in apertures 60 by dimensioning them to provide a slight interference fit with pin 62.

A connecting rod 66 is on one end attached to piston 46 and on the other end it projects through cap 50. Connected to the other end of rod 66 is a sleeve or collar 68 and the latter includes a central opening 70. The size of opening or cavity 70 allows the cam follower to be driven therethrough when opening 70 is lined up between slots 24 of bracket 20. Similar to demountable attachment of drift pin 62 in apertures 60, the sizing of opening 70 and cam roller or follower 72 permits the latter to be frictionally but detachably retained in the former. Ease of disassembly is assured since pushing on follower 72 along its longitudinal axis will cause the same to slide clear of engagement with the sleeve 68. As seen, spacers 74 ride cam roller 72 lateral to respective slots 24 and act to provide a smooth bearing surface interposed between the inside face of the frame sides 12 and 14 with their respective adjacent arms 22. Preferably, the cam follower is fabricated from self-lubricating nylon. When follower 72 slides into engagement with sleeve 68, with the latter being positioned between arms 22, the follower will reside flush with the outboard face of sides 12 and 14 as shown.

A fail-safe mechanism, the operation of which is described hereafter, is optionally supplied. The fail-safe system includes a support plate 76 dimensioned so as to effectively cap one end of frame 10 as shown in FIG. 1. Biasing means 78 on one end reacts against cap 76 while on the other end it is connected to and biases sleeve part 68 and hence bracket part 20. It will be appreciated that by pivotal suspension of this last mentioned element, spring 78 effects a counter-clockwise movement about pivot pin 36 when looking in the direction of the arrows of FIG. 1. This movement tends to effect relative displacement of follower 72 on path 17 to cause the landing gear to move towards the wheels down position.

Figure 4:
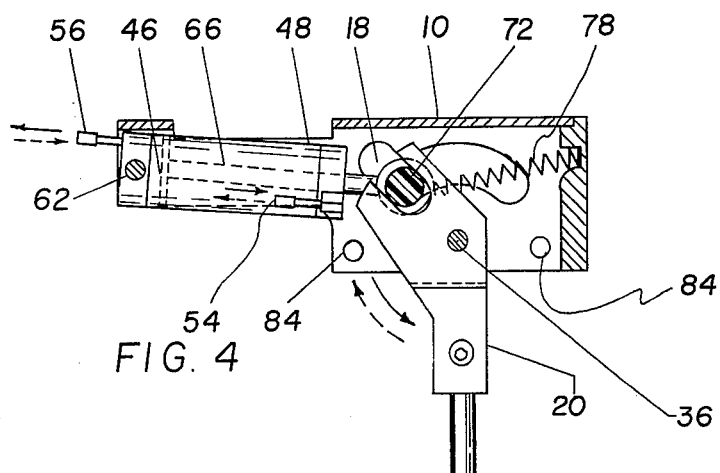
FIG. 4 is a view similar to FIG. 3 showing the landing gear in the fully extended position with the cam follower about to engage the second or locking portion of the control path; and, FIG. 5 is a view similar to FIG. 4 showing the cam follower engaging the second or locking cam portion retaining the inventive apparatus in the extended or down position.
Figure 5:
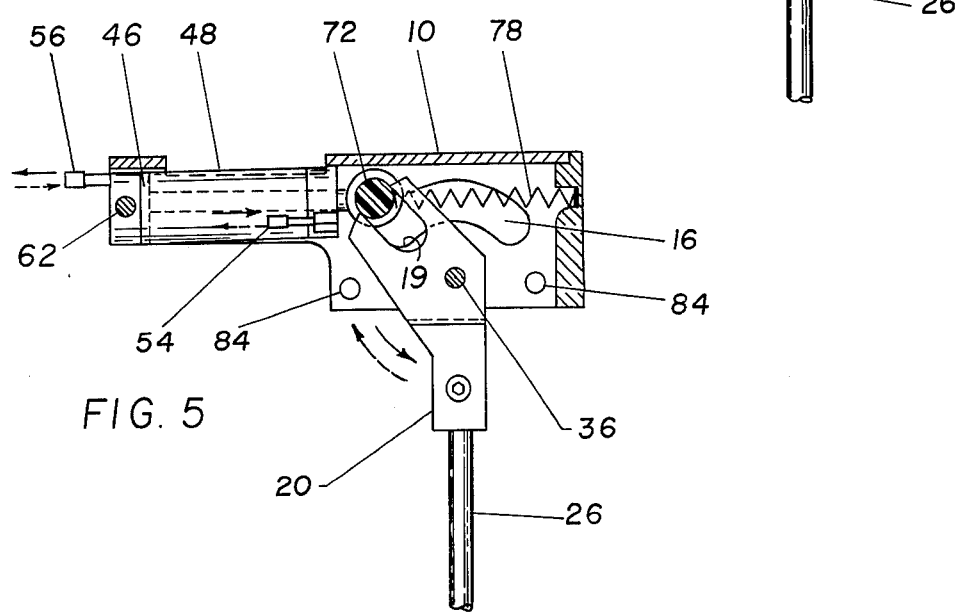

Operation of the inventive retractable landing assembly can best be understood by reference to FIGS. 3, 4 and 5.

A remote pressurized fluid system, common in the art, and therefore not shown, is connected to each of inlet-outlet means 54 and 56. In FIG. 3 the landing assembly and part thereof is shown in its fully retracted or wheels up position. On command, the pressurized and remote fluid system supplies pressure to inlet-outlet means 54 that, during this sequence, acts as an inlet. Application of pressure there drives piston 46 to the left as viewed in FIG. 3 which causes connecting rod 66 to move sleeve 68 effecting relative displacement of follower 72 along the first portion 16 of control path 17. The relative movement between the roller or follower 72 and the portion 16 is constrained and guided by the walls of portion 16, and being so confined causes bracket 20 and hence strut 26 to move to the merger or coterminous point 19. Continued application of fluid pressure through inlet 54 causes the apparatus to reach the position of FIG. 4. Of course, it will be understood that during the above routine, inlet-outlet means 56 permits egress of fluid from actuator cylinder 48 and so acts as an outlet. Further application of fluid pressure at inlet 54 causes the piston to drive cam 72 out of merger point 19 and into second portion or locking detent 18 as seen in FIG. 5. The merger point 19 performs an over-the-center function which, when the follower 72 moves beyond the landing gear moving portion 16 into the upwardly inclined portion 18, serves to restrain and lock the bracket 20 in a position that is over its center and fully down position. Thus, the strut 26 cannot be retracted until a retracting force physically moves the same and the follower 72 down the portion 18 and beyond the over-the-center point 19 and back to the gear operating portion 16. Consequently, bracket 20 and therefore strut 26 and wheel 32 are then restrained and held or immobilized in the extended or full wheels down mode. Once cam follower 72 engages detent 18, the locking action afforded by the latter is independent of fluid pressure application.

To release or unlock the apparatus and retract the landing gear part, a command is sent to the remote pressurized fluid source. Fluid under pressure then enters inlet-outlet means 56 that, during their unlocking and retracting sequence, acts as an inlet. Admission of fluid at inlet 56 drives piston 46 to the right when looking at FIG. 5 and in so doing causes cam 72 to act against, or more relative to, locking detent 18. Detent 18 is configured to cause a component of force to act on cam follower 72 in the downward direction, the result of which drives cam follower 72 into merger point 19 coterminous with first control portion 16. The position of FIG. 4 is then reached and the bracket is now free. Further application of fluid pressure at inlet 56 drives cam follower 72 into and along first portion 16 of control path 17 which is rightward in FIG. 4. This movement of follower 72 rotates bracket 20 clockwise until the cam assumes the position of FIG. 3 and in so doing retracts the landing gear. During this retract routine, inlet-outlet means 54 permits egress of fluid from cylinder 48 and so acts as an outlet.

The preferred embodiment will include the fail-safe system and its operation is as follows. Again observing FIGS. 3, 4, and 5, it will be noticed that fail-safe biasing means 78 is continually reacting against collar 68 and hence cam follower 72. Actuator 49 is designed to work against the added load of spring 78. The force exerted by spring 78 is such that with absence of fluid pressure in cylinder 48, the spring is capable of driving cam follower 72 into locking detent 18. This movement of cam follower 72 propels the landing strut or carriage to the down or extended position. If fluid pressure fails during command operation of piston 46, spring 78 will automatically cause extension of the landing gear. Thus, even with complete failure of the aircraft's hydraulic or pneumatic system, automatic deployment of the landing gear occurs.

Owing to the unique and simplified construction of the inventive apparatus, frame 10 is designed to fit between adjacent sets of wing ribs 80 and spars 82, and modification of aircraft superstructure is unnecessary since no structural part of the present invention projects lateral and outboard from either side 12 or 14. Hard wood shims, not shown, will interface each outboard face of sides 12 and 14 with its adjacent spar 82. Fastening means will grasp apertures 84 that will, in the preferred embodiment, be tapped to receive screws.

When so located and secured between the sets of ribs 80 and spars 82, the present apparatus adds rigidity and strength to the wing structure by becoming an integral part thereof. Further, when the frame 10 is so secured in place, all of the otherwise easily disassemblable structural elements as the follower 72 and the pins 36 and 62 are irremovably retained in place by the facing and obstructing walls of the spars 82. Therefore, until such time as the assembled invention is removed from the wing, all of its functioning parts will be unable to become accidentally dislodged.

Primarily, application of the inventive landing apparatus will be in model aircraft, but it is to be understood that application is not to be so limited. The inventive device may also find utility in passenger aircraft and other machines.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. In a retractable landing system, apparatus comprising
control path means having first and second portions merging intermediate their ends at a point from which said first and second portions diverge from a straight line angularly relative to each other,
follower means adapted to move relative to and along said first and second portions and the merger point of said control path means,
and fluid actuator means for moving said follower means relative to said control path means to thereby drive a part of the landing apparatus between an extended and retracted position.

2. In a retractable landing apparatus of claim 1, wherein the extended position corresponds to a first displacement of said follower means relative to the first portion of said control path means,
and wherein the retracted position corresponds to a second displacement of said follower means relative to the first portion of said control path means, said second displacement being spaced from said first displacement.

3. In a retractable landing apparatus of claim 2, wherein the second portion of said control path means is angularly disposed with respect to the first portion thereof.

4. In a retractable landing gear apparatus of claim 3, wherein engagement of said follower means in the second portion effects a locking action of said follower means to retain said part in the extended position.

5. In a retractable landing gear apparatus of claim 1, further including biasing means acting against said actuator means so that in event of failure of said actuator means, said biasing means causes relative displacement of said follower means on said control path means to cause said follower means to engage the second portion of said control path means.

6. In a retractable landing gear apparatus of claim 4, wherein said follower means comprises:
a follower pin,
a support bracket demountably pivotal on the apparatus and adapted to engage and track said follower pin,
a landing strut on one end attached to said support bracket,
and a wheel attached to the other end of said strut for movement therewith to selectively reciprocate between said extended and retracted positions.

7. In a retractable landing gear apparatus of claim 6, further including pivot pin means frictionally and demountably securing said support bracket and actuator means to the apparatus,
and wherein said follower pin is slidably retained in said support bracket so that the apparatus can be dismantled by pressing along the longitudinal axes of said pivot pin means and follower pin.

8. In a retractable landing gear apparatus of claim 7, including a frame bent into a U-shape with opposed sides substantially parallel and wherein the control path means comprises two control curves one on each of said opposed sides allowing said pivot pin means and follower pin to be cut so that same are flush with the outboard faces of said opposed sides permitting the apparatus to be placed in an aircraft without having to cut the superstructure thereof.

9. In a retractable landing system having a landing gear,
a cam having a plurality of interconnected angularly offset cam surfaces, a support supporting said cam, a bracket supporting a landing gear, a cam follower on said bracket, said offset cam surfaces and follower being connected for relative movement, and actuator means to cause the relative movement of said cam and said follower with said follower moving between said plurality of angularly offset cam surfaces to move said bracket and landing gear between a retracted and an extended position, and a fail-safe system to drive the landing gear to the extended position on failure of said actuator means.

10. In a retractable landing system as in claim 9, wherein said plurality of cam surfaces comprises two differently shaped portions.

11. In a retractable landing system as in claim 10, wherein one of said portions is of a curvilinear shape ending in opposed stops, each of said stops corresponding to respective retracted and extended positions of said landing gear.

12. In a retractable landing system as in claim 11, wherein the other of said portions is substantially straight and is positioned so as to be continuous with one of said opposed stops that corresponds to the extended position.

13. In a retractable landing system as in claim 9, said actuator means being fluid powered to drive said cam follower relative to said cam surfaces.

14. In a retractable landing system as in claim 13, wherein said actuator means is pivotally supported between said follower and support.

15. In a retractable landing system as in claim 14, wherein said actuator means is a double acting fluid pressure device.

16. In a retractable landing system as in claim 13, wherein said actuator means is adapted to provide selective reciprocal movement of said follower relative to and along said cam.

17. In a retractable landing system as in claim 13, wherein said fail-safe system includes biasing means operating on said follower.

18. In a retractable landing system as in claim 17, wherein said biasing means consists of a spring on one end reacting against said support and on the other end reacting against said bracket.

19. In combination, in a retractable landing gear apparatus including a landing gear, a frame having a control path, said path having merging first and second portions and an over-the-center portion therebetween, support means pivotal on said frame and including follower means adapted for relative movement with respect to and along said path portions, actuator means to cause said relative movement and thereby effect displacement of the landing gear between extended and retracted positions corresponding to movements of said follower means from one to the other of said first and second portions, the landing gear being locked in its fully extended position when said follower means engages said second portion.

20. The combination of claim 19 further including fail-safe biasing means normally biasing said follower means to engage said second portion.

* * * * *

UNITED STATES PATENT OFFICE
CERTIFICATE OF CORRECTION

PATENT NO. : 3,900,988
DATED : August 26, 1975
INVENTOR(S) : ROMANO GARABELLO

It is certified that error appears in the above-identified patent and that said Letters Patent are hereby corrected as shown below:

Claim 12, Line 3, change "continuous" to --coterminous--

Signed and Sealed this ninth Day of December 1975

[SEAL]

Attest:

RUTH C. MASON
Attesting Officer

C. MARSHALL DANN
Commissioner of Patents and Trademarks